(12) United States Patent
Gustavsson et al.

(10) Patent No.: US 12,282,984 B2
(45) Date of Patent: *Apr. 22, 2025

(54) AUGMENTING A FIRST IMAGE WITH A SECOND IMAGE

(71) Applicant: Inter IKEA Systems B.V., Ln Delft (NL)

(72) Inventors: Jonas Gustavsson, Lomma (SE); Camila Dorin, Älmhult (SE)

(73) Assignee: Inter IKEA Systems B.V., Ln Delft (NL)

( * ) Notice: Subject to any disclaimer, the term of this patent is extended or adjusted under 35 U.S.C. 154(b) by 0 days.

This patent is subject to a terminal disclaimer.

(21) Appl. No.: 17/902,411

(22) Filed: Sep. 2, 2022

(65) Prior Publication Data
US 2022/0414998 A1    Dec. 29, 2022

Related U.S. Application Data

(63) Continuation of application No. 17/123,526, filed on Dec. 16, 2020, now Pat. No. 11,436,805.

(30) Foreign Application Priority Data

Dec. 17, 2019    (EP) ..................................... 19217058

(51) Int. Cl.
*G06T 11/00* (2006.01)
*G06F 16/583* (2019.01)
(Continued)

(52) U.S. Cl.
CPC ........ *G06T 11/001* (2013.01); *G06F 16/5854* (2019.01); *G06K 7/1417* (2013.01);
(Continued)

(58) Field of Classification Search
CPC . G06T 11/001; G06T 19/006; G06T 2200/24; G06T 2219/2016;
(Continued)

(56) References Cited

U.S. PATENT DOCUMENTS 10,846,552 B1    11/2020 Wu et al.
11,321,768 B2    5/2022 Beauchamp
(Continued)

OTHER PUBLICATIONS

Let's Do Video, "Zoom Virtual Backgrounds", YouTube video posted on Jul. 23, 2018. https://www.youtube.com/watch?v=0038JewoGOo (Year: 2018).*

(Continued)

*Primary Examiner* — Chong Wu
(74) *Attorney, Agent, or Firm* — Merchant & Gould P.C.

(57) ABSTRACT

A computer implemented method for augmenting a first image with image data from a second image, the method comprising: receiving (S02) the first image depicting a first scene; capturing (S04) the second image depicting a second scene using an image capturing device; identifying (S06) an object in the second image; receiving (S08) a 3D model from a database, the database comprising a plurality of 3D models, the 3D model corresponding to the identified object of the second image; aligning (S10) the 3D model with the identified object in the second image; extracting (S12) pixel data from the second image using a contour of the 3D model's projection onto the second image; inserting (S14) the extracted pixel data of the second image data into the first image, thereby rendering an augmented image.

20 Claims, 7 Drawing Sheets

(51) Int. Cl.
*G06K 7/14* (2006.01)
*G06T 19/00* (2011.01)

(52) U.S. Cl.
CPC ........ *G06T 19/006* (2013.01); *G06T 2200/24* (2013.01); *G06T 2219/2016* (2013.01)

(58) Field of Classification Search
CPC . G06T 2207/20092; G06T 2207/20221; G06T 2207/30204; G06T 5/005; G06T 5/50; G06T 7/12; G06T 7/194; G06T 11/60; G06T 2210/04; G06T 5/77; G06F 16/5854; G06K 7/1417
See application file for complete search history.

(56) References Cited

U.S. PATENT DOCUMENTS 11,436,805 B2 * 9/2022 Gustavsson ............... G06T 5/50

| | | |
|---|---|---|
| 2017/0214899 A1 | 7/2017 | Meler et al. |
| 2017/0243352 A1 | 8/2017 | Kutliroff |
| 2019/0244407 A1* | 8/2019 | Wiesel ................... G06T 11/00 |
| 2020/0005542 A1 | 1/2020 | Kocharlakota et al. |
| 2021/0256707 A1 | 8/2021 | Brown et al. |

OTHER PUBLICATIONS

European Search Report for EP Application No. 19217058.7 mailed Jun. 23, 2020 (8 pages).

Weiss et al. "Automated Layout Synthesis and Visualization from Imageds of Interior or Exterior Spaces." IEEE, Jul. 21, 2017, pp. 41-47.

Izadinia et al. "IM2CAD" IEEE, Jul. 21, 2017, pp. 2422-2431.

Siltanen et al. "Augmented interiors with digital camera images." ADvances in Ontologies, Jan. 2006, pp. 33-36.

Heimann et al. Model-based Segmentation Biomedical Image Processing Springer Ed. (2011), p. 273-303.

* cited by examiner

AUGMENTING A FIRST IMAGE WITH A SECOND IMAGE

CROSS-REFERENCE TO RELATED APPLICATIONS

This application is a Continuation of U.S. application Ser. No. 17/123,526, filed Dec. 16, 2020, which claims benefit of Ser. No. 19/217,058.7, filed 17 Dec. 2019 in Europe, the entire disclosure of which are hereby incorporated by reference. To the extent appropriate, a claim of priority is made to the above disclosed applications.

TECHNICAL FIELD

The present disclosure relates to the field of image analysis, in particular, it relates to a method for augmenting a first image using image data from a second image. The disclosure also relates to a device comprising circuitry configured to carry out the method. The disclosure also relates to a computer program product adapted to carry out the method.

BACKGROUND

In image search approaches, it is often desirous to determine and identify which objects are present in an image. Image search approaches and image recognition approaches are common for commercial use, for example to generate product catalogues and product suggestions. It has been desirous to achieve a system where a user can take a photograph of a room, where the image search process can use image data to search product catalogues on the internet to return for example different stores' prices for a given product.

It is often desirous to augment an image such that it can easily be manipulated by a user. This is beneficial for industrial areas where predicting visualizations are can be used such as building construction or indoor design.

Typically, an image can be augmented such that a data model of an object can be placed in the image such that a user can visualize how the scene may look like with the added model. However, these methods are limited, and the final augmented image is a virtual image wherein the realness of the object is missing, since it is constructed from a model.

Therefore, there is room for improvements in the field of image analysis and augmenting of images.

SUMMARY

In view of that stated above, an object of the present disclosure is to provide a method for augmenting an image with image data relating to an object such that the augmented image contains real image data for the object. It is further an object to use image analysis and image manipulation approaches to achieve the above in an automatic or semi-automatic fashion.

To achieve at least one of the above objects and also other objects that will be evident from the following description, a computer implemented method, a device for carrying out the method, and a computer program product for carrying out the method provided according to the present disclosure. Preferred embodiments of the device will be evident from the description.

According to a first aspect, there is provided a computer implemented method for augmenting a first image with image data from a second image, the method comprising:

receiving the first image depicting a first scene;
capturing the second image depicting a second scene using an image capturing device;
identifying an object in the second image;
receiving a 3D model from a database, the database comprising a plurality of 3D models, the 3D model corresponding to the identified object of the second image;
aligning the 3D model with the identified object in the second image;
extracting pixel data from the second image using a contour of the 3D model's projection onto the second image;
inserting the extracted pixel data of the second image data into the first image, thereby rendering an augmented image.

Objects in the second image may be segmented (extracted, distinguished, etc.) using any known algorithm, such as algorithms using one or more of edge features, binary patterns, directional patterns, Gradient features, Spatio-Temporal domain features etc.

The step of identifying an object in the second image may be done by an image search algorithm. By the term "image search algorithm", should in the context of the present specification, be understood as any known way to search for images (of objects) in a database which are similar to an object of the image and use the outcome (e.g. labels/classification of similar images found in the database) to classify the object. Examples of known commercial image search algorithms at the filing of this disclosure comprises Google images, TinEye and Alibabas Pailitao.

The provided method is an improved method for augmenting an image and keeping the augmented image realistic. By adding image data from the second image, the realistic view of the augmented image may be achieved.

By receiving a 3D model for the identified object, the image segmentation may be improved such that only, or almost only, the image data pertaining to the identified object is extracted, and such that all or almost all image data pertaining to the identified object is extracted. The received 3D model is thus used to decide which part of the second image to extract image data to avoid extracting any surrounding of the object. This may improve the augmented image by improving the realistic view of the image in an efficient manner. A low-complexity process for adding image data from a second image to a first image may thus be achieved.

The provided method allows a user to augment an existing image with image data from another image (e.g. newly taken) to see what an object may look like in the scene of the first image.

According to some embodiments, the method further comprises determining a first 3D coordinate space of the first image;
determining a second 3D coordinate space of the second image;
determining an object coordinate for the identified object in the second image using the second 3D coordinate space, and
wherein inserting the extracted pixel data of the second image data into the first image comprises inserting the extracted pixel data, at a position coordinate in the first image corresponding to the object coordinate. By determining a first and second 3D coordinate space, a low-complexity model for inserting pixel-data into the first image may be achieved. With the position coordinate corresponding to the object coordinate the predictability for where in the first image the pixel data is inserted may be more precise.

Thereby, placement of the extracted pixel data at a desirous position in the first image is facilitated. Accordingly, the desired position may be easy to manipulate due to the adapted 3D coordinate spaces between the two images.

By way of example, if the identified object in the second scene is a chair at a right bottom corner of the second scene, the extracted pixel data of said chair may be automatically placed at a bottom corner of the first scene.

According to some embodiments, the method further comprises adjusting the position of the extracted pixel data in the augmented image by:
zooming in or out, or translating the first image, thereby manipulating the first 3D coordinate space of the first image,
adjusting the position of the extracted pixel data in the augmented image to correspond to the object coordinate in the manipulated 3D coordinate space of the first image.

By adjusting the position of the pixel data in the augmented image, image manipulation of the augmented image may be facilitated in an efficient manner. The manipulation of the first image allows for manipulation of the augmented image without requiring manipulation of the extracted pixel data, or without requiring that a new image of the object is captured, thus leading to a simplified procedure for augmenting the first image with image data from the second image.

According to some embodiments, the method further comprises
for the 3D model, defining a first value for a scale parameter, a first value for a translation parameter, and a first value for a rotation parameter,
for the identified object in the second image, defining a second value for a scale parameter, a second value for a translation parameter, and a second value for a rotation parameter, and
aligning the 3D model to the determined 3D coordinate space of the second image by manipulating one or more of the first scale parameter, the first translation parameter and the first rotational parameter of the 3D model, such that the first scale parameter corresponds to the second scale parameter, and the first translation parameter corresponds to the second translation parameter, and the first rotation parameter corresponds to the second rotation parameter. The alignment of the 3D model to the identified object in the second image may be performed in an efficient and automatic manner by the rotation, movement or scaling of the 3D model. An image algorithm may be applied to the image and the 3D model to determine when the 3D model has a proper alignment with the identified object.

According to some embodiments the method comprises requesting an input from a user;
receiving an input from the user, and wherein the step of receiving the 3D model comprises sending data pertaining to the received input to the identified object to the database. By utilizing a user input, the processing power needed to perform the step of receiving a 3D model may be reduced. The user input may pertain to the identified object in the second image, and accordingly, data may be sent to the database requesting a 3D model of such identified object. The user input may in some embodiments pertain to a category or object type of the identified object, accordingly lessen the processing time needed to receive a 3D model corresponding to the identified object.

A user input may allow the method to omit processing steps, leading to a more efficient method for augmenting a first image with image data form a second image. The user input may be requested and received in any known manner such as using a graphical user interface, a voice interface, etc.

According to some embodiments, the method further comprises.
identifying one or more objects in the first image; and
removing at least one of the one or more identified objects in the first image or manipulating at least one of the one or more identified objects by changing a position of at least one of the one or more identified objects in the first image.

By removing, or changing a position of, an object, an empty space in the scene may be created. Consequently, the present embodiment allows for rearranging the scene in the first image as desired to fit the pixel data of the identified object from the second image. Any known method or software for changing a position of, or removing, an object in an image may be employed.

According to some embodiments, the method further comprises removing the inserted pixel data from the augmented image;
capturing a third image of the second scene using the image capturing device;
re-identifying the previously identified object of the second image in the third image;
calculating a third 3D coordinate space for the third image;
aligning the 3D model with the identified object in third image;
extracting pixel data from the third image of a contour of the 3D model projection onto the third image;
determining a second object coordinate for the identified object in the third image using the third 3D coordinate space;
inserting the extracted pixel data of the third image data into the first image at a position coordinate in the first image corresponding to the second object coordinate.

As such, the augmented image may be manipulated in a simple manner, where the first image is left untouched, and the second image is re-captured as the third image to provide a low-complexity method. By way of example, if a user is unsatisfied with the positioning of the identified object in the augmented image, the user may capture a new image of the second scene comprising the identified object. By the user and the capturing camera device changing position or angle in relation to the identified object, the second object coordinate is manipulated and accordingly, the position coordinate may be manipulated. Advantageously, a low-complexity method may be provided where the realistic view of an augmented image may be manipulated in a simple manner.

According to some embodiments, the step of identifying the object in the second image comprises determining an object type using an image search algorithm. Any suitable image search algorithm may be used to determine the object type. By determining the object type for the object, the method may identify the object in a more efficient manner. By determining the object type, the receiving of the 3D model may be based on the object type. For example, if the object type is deemed to be utensils, the received 3D model may be of the same object type, thus saving time during calculations.

According to some embodiments, the step of identifying the object in the second image comprises scanning a QR code on the object to be identified in the second scene. The QR code may comprise data pertaining to the object type of the identified object. It is to be noted that the QR code may contain a variety of relevant data for identifying the object. The data contained in the QR code may be sent to the database for the receiving of the 3D model. The QR code may in some embodiments comprise data pertaining to a 3D model of the object having said QR code, e.g. an identifier for the 3D model in the database.

According to some embodiments, the step of identifying the object in the second image comprises reading a beacon signal transmitted by the object to be identified in the second scene. By way of example, the beacon signal may determine which object in the image is closest to the camera device, and thereby said object may be the chosen object to be identified. The beacon signal may comprise data identifying the object and such data may thus be transmitted to the database to receive the corresponding 3D model from the database.

According to some embodiments, the step of receiving the 3D model comprises sending image data pertaining to the identified object to the database. As such, mapping the image data to a corresponding 3D model may be performed by e.g. a server hosting the database. Consequently, the computational power required to perform the method of augmenting the first image with image data from the second image may be advantageously distributed between several devices.

According to some embodiments, the step of capturing a second image comprises using AR or VR equipment, and wherein the method further comprises displaying the augmented image using said AR or VR equipment. By using AR or VR equipment the augmented image may be realistically displayed to a user.

It is to be noted that the second image may be captured using any camera device.

According to some embodiments, the method further comprises storing the augmented image in a memory. It is to be noted that the memory may also store the first image. The memory may also store the second image. Data pertaining to the executed steps of the method may be stored in the memory. By storing the augmented image in the memory, the method may be performed iteratively such as to become more and more automatic and quicker in terms of processing. In other words, by the memory storing data pertaining to the images and optionally method steps performed thereto, the memory may generate a compilation of examples of how to for example place an object in the first image. The memory may gather data pertaining to common placements of object types in relation to a specific scene. Such data may be utilised by the memory to recommend manipulations of any one of the images or to recommend a position for placement of the extracted pixel data.

According to a second aspect, there is provided a device configured to augment a first image with image data from a second image, the device comprising circuitry configured to perform the method of the first aspect.

According to a third aspect, there is provided a computer program product comprising a computer-readable storage medium with instructions adapted to carry out the method of the first aspect when executed by a device having processing capabilities.

The second and third aspects may generally have the same features and advantages as the first aspect.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present disclosure, will be better understood through the following illustrative and non-limiting detailed description of preferred embodiments of the present disclosure, with reference to the appended drawings, where the same reference numerals will be used for similar elements, wherein.

DESCRIPTION OF EMBODIMENTS

The present disclosure will now be described more fully hereinafter with reference to the accompanying drawings, in which currently preferred embodiments of the disclosure are shown. This technology described herein may, however, be embodied in many different forms and should not be construed as limited to the embodiments set forth herein; rather, these embodiments are provided for thoroughness and completeness, and fully convey the scope of the invention to the skilled person.

In the following, a method will be described for augmenting a first image with image data form a second image. The method may facilitate augmentation of images and by doing so improving the realistic view of an augmented image. The method may further allow for manipulation of the augmented image. The method may be carried out on a device configured to augment the first image with image data from the second image. Such device may comprise one or more processors. A computer program product comprising a computer-readable storage medium with instructions may be adapted to carry out the method when executed by a device having processing capabilities.

In short, the method comprises extracting selected image data, pixel data, from the second image and inserting it into the first image and thereby render the augmented image.

Figure 1:
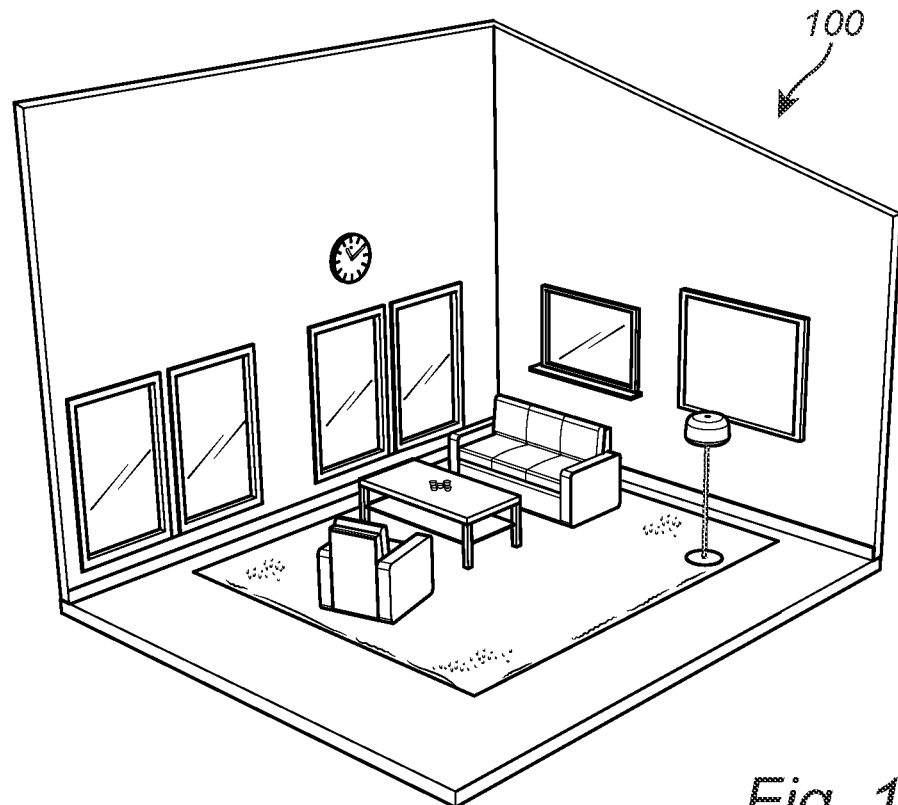
FIG. 1 illustrates a first scene.

FIG. 1 discloses a first image 100 depicting a first scene. The first image 100 may be retrieved from a memory storing the first image 100. The first image 100 may be captured by a mobile device (smartphone, body worn camera etc.) and sent to another device for analysis. Any other suitable means for capturing an image may be used, such as through the use of a virtual reality, VR, device, or a augmented reality, AR, device, etc. The first image 100 may be provided as a 2D image. In the example of FIG. 1, the first image 100 depicts the first scene having a floor extending in a X, Z plane, a first wall extending in a Y, Z plane and a second wall extending in an X, Y plane.

A first 3D coordinate space may be determined for the first image 100.

The first 3D coordinate space may extend along a X, Y Z plane/direction. The 3D coordinate space may be determined through applying an algorithm to the image. It is to be noted that there are many algorithms that may be suitable for calculating and determining a 3D coordinate space. By way of example, the 3D coordinate space may be calculated by applying a Plane detection algorithm, or a RANSAC algorithm, or a Hough algorithm, etc., to the first image 100.

The first image 100 may comprise a plurality of objects, in the example of FIG. 1, a three-seat sofa, an armchair, and a coffee table etc.

The first image 100 may be captured using a first field of view.

A virtual scene of the first image may be generated through using a device comprising one or more processors. The one or more processors may be configured to execute a computer program product comprising code sections having instructions for a method for how to generate a virtual scene of objects. The device may generate the virtual scene by receiving the first image and processing said first image. The processing of said first image is done by image analysis and image manipulation. The generated virtual scene may be displayed on the device, or a mobile device etc. It is noted that the virtual scene may be displayed on any suitable means for displaying a virtual scene.

One or more objects in the first image may be identified. The one or more objects in the first image may be identified using an image search algorithm.

In some embodiments, at least one of the one or more identified objects in the first image may be removed. Alternatively, or additionally, the first image 100 may be manipulated as to changing a position of at least one of the one or more identified objects in the first image. Accordingly, at least one of the one or more identified objects may be manipulated.

Now turning to FIGS. 2A-2D it will be described in detail how to extract image data from a second image.

Figure 2A:
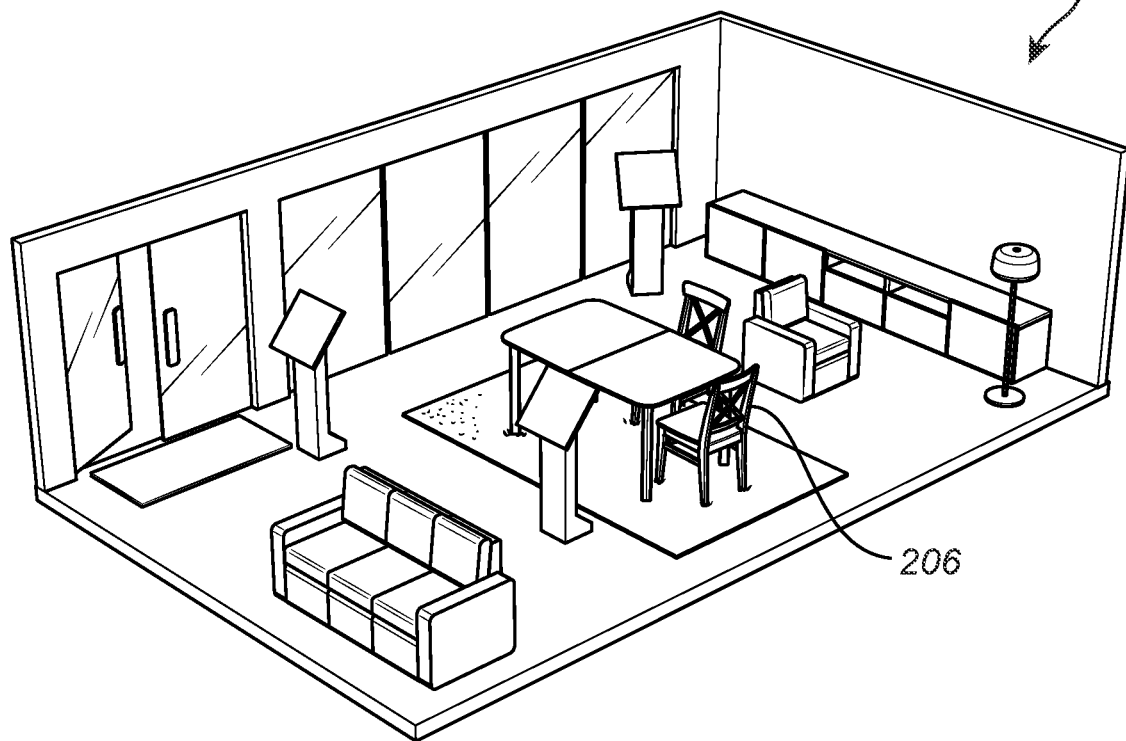
FIG. 2A illustrates a second scene.
Figure 2B:
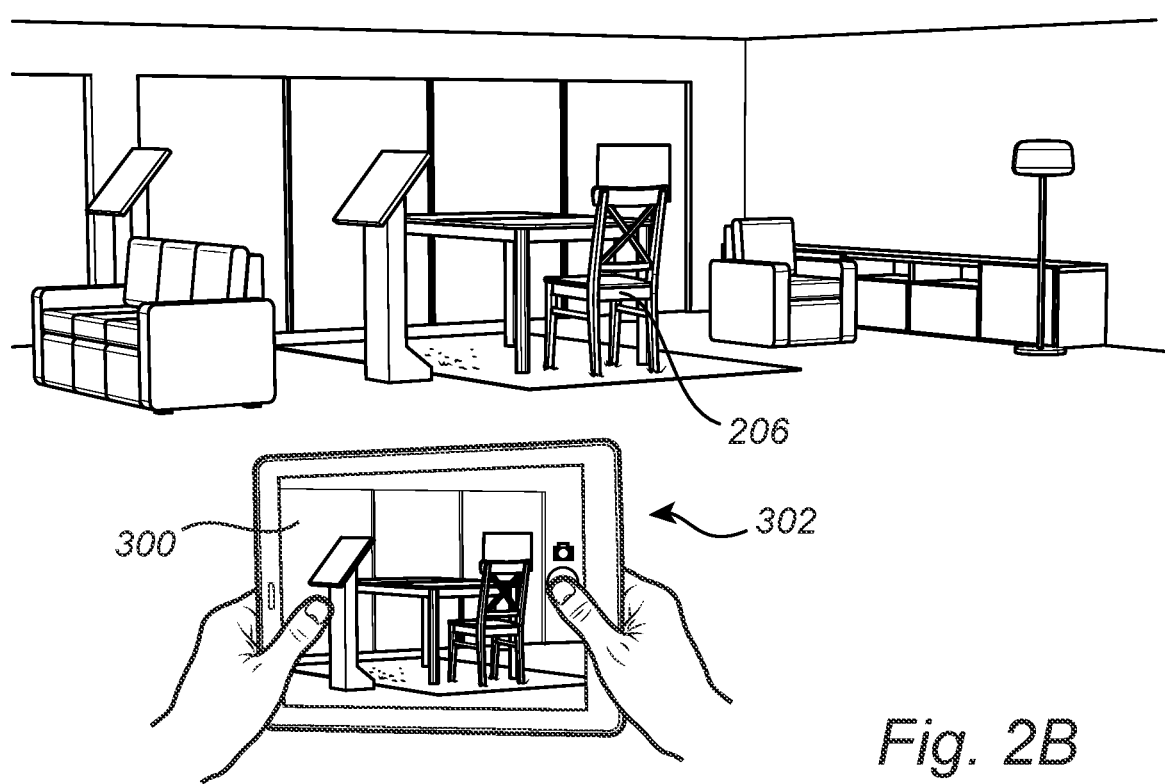
FIG. 2B illustrates an image being captured of the second scene.

FIG. 2A shows a second scene 200. A second image 300 is captured by an image capturing device 302, as is shown in FIG. 2B. The second image 300 may be captured by a mobile device (smartphone, body worn camera etc.) and sent to another device for analysis. The second image 300 may be captured by any camera device. The second image 300 may be captured using AR or VR equipment. The second image 300 depicts a part of the second scene 200.

The second image 300 may be captured using a second field of view.

When processing the second image 300, an object 206 is identified. In the following example, the identified object 206 will be represented by a chair 206, as is shown in FIG. 2A. It is to be noted that the method is not limited to identifying furniture as objects in the second image 300. By way of example, during construction of a building, the identified object may be a door or a window.

Identifying an object within the scene may be done by an image search algorithm as described above. By the use of an image search algorithm, an object type for the identified object may be determined.

In some embodiments, the identifying of an object 206 in the second image 300 may be done by scanning a QR code on the object to be identified. As such, the object to be identify comprises a QR code. Data pertaining to the object type, an object number may be comprised in the QR code. In other words, an object identifier may be comprised in the QR code.

The identifying of an object in the second image may be done by reading a beacon signal transmitted by the object to be identified in the second scene 200. As such, the beacon signal may comprise data pertaining to the object closest to the image capturing device being the object to be identified. By way of example, the beacon signal may determine which object in the image is closest to the camera device, and thereby said object may be the chosen object to be identified. The beacon signal may comprise data identifying the object and such data may thus be transmitted to the database to receive the corresponding 3D model from the database. The beacon technology may use Bluetooth or low energy Bluetooth to send the device a beacon signal relating to the identified object.

Any suitable wireless information sharing protocol, such as for example wi-fi, may be used to transmit the beacon signal.

In another example ultra-wide band technology may be used to identify objects, e.g. in conjunction with the capturing the second 300, or third image of the second scene 200. Moreover, ultra-wideband technology may improve the spatial awareness of objects in the scene. The ultra-wideband technology may determine a precise location of the object to be identified in a low-complexity manner. Ultrawideband technology may be implemented into the camera capturing device.

Beacon technology may facilitate the identifying of an object in the second image, by the placement of beacons in the second scene 200.

In some embodiments, the identifying of an object in the second image may be done by requesting an input from a user. It is to be noted that a user input may be requested for other purposes as well and is not limited to the identification of the object in the second image. Accordingly, a user input may be requested. Consequently, a user input may be received. The user input may be requested and received at the device capturing the second image, or at another device.

When identifying the object in the second image, an object distance and an object angel may be determined relative to the second field of view.

A second 3D coordinate space may be determined for the second image 300. By determining the second 3D coordinate space, an object coordinate may be determined for the identified object 206 in said second 3D coordinate space. The second 3D coordinate space may be determined as described above for the first 3D coordinate space.

Figure 2C:
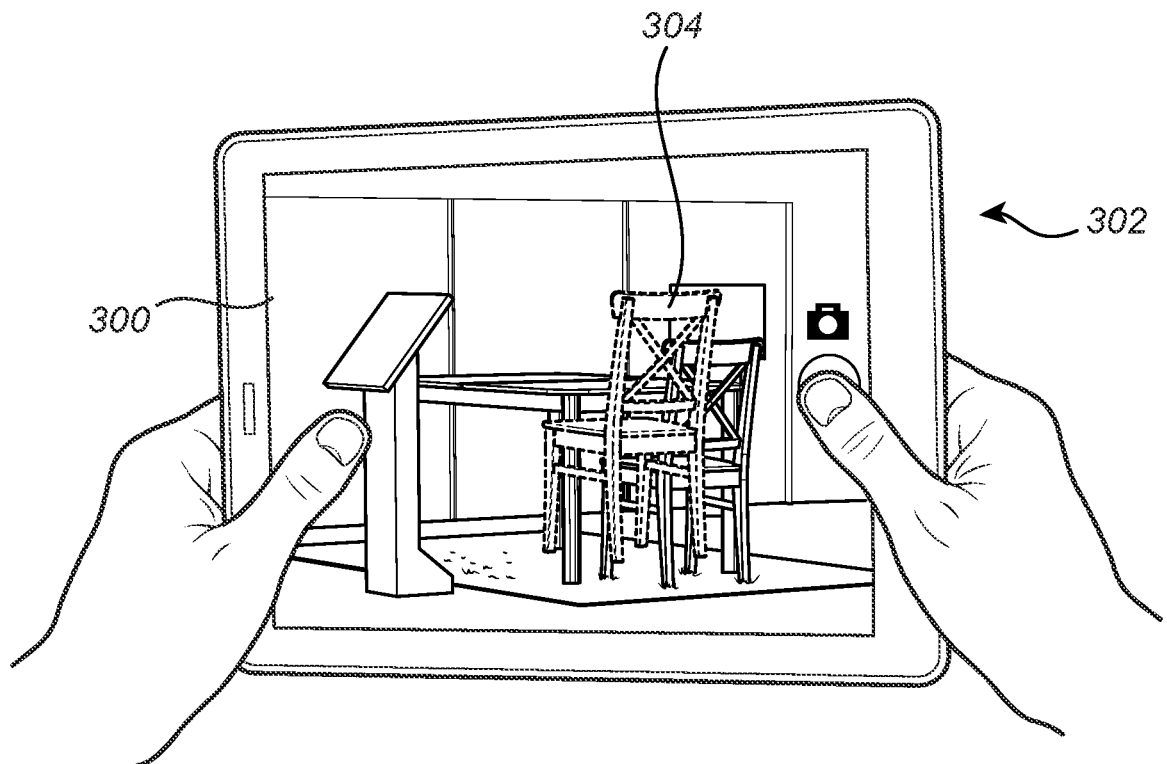
FIG. 2C illustrates the image from FIG. 2B.

As is shown in FIG. 2C, a 3D model 304 corresponding to the identified object 206 of the second image 300 is received. The 3D model 304 is received from a database comprising a plurality of 3D models. The received 3D model 304 is corresponding to the identified object 206 in the second image 300.

The 3D model 304 is a 3D model of the chair 206 that has been identified in the second image 300. The received 3D model may be based on the determined object type of the identified object 206. By sending the object type to the database, the processing type for retrieving the corresponding 3D model 304 may be reduced. The object identifier may be sent to the database in order to retrieve a corresponding 3D model in an efficient manner. Data pertaining to the received input from the user may be sent to the database. In other words, data pertaining to the identified object 206 may be sent to the database.

For the 3D model 304, a first value for a scale parameter may be defined. For the 3D model 304, a first value for a translation parameter may be defined. For the 3D model 304, a first value for a rotation parameter may be defined. Each one of the first scale parameter, the first translation parameter, and the first rotation parameter may be manipulated.

The 3D model 304 is then aligned to the chair, the identified object 206, in the second image 300, such that the 3D model 304 has a contour projection onto the second image 300 that aligns with the outline of the chair 206. In aligning the 3D model 304 to the identified object 206, a second value for a scale parameter may be determined for the identified object 206. A second value for a translation parameter may be determined for the identified object 206. A second value for a rotation parameter may be determined for the identified object 206.

During the alignment of the 3D model 304, one or more of the first scale parameter, the first translation parameter, and the first rotation parameter may be manipulated such that the first scale parameter corresponds to the second scale parameter, the first translation parameter corresponds to the second translation parameter and the first rotation parameter corresponds to the second rotation parameter. In other words, the 3D model may be manipulated and aligned to the second 3D coordinate space of the second image.

Thereafter pixel data 208 of the 3D model's contour projection onto the second image 300 is extracted. In other words, pixel data 208 of the chair 206 is extracted from the second image 300.

By aligning the 3D model 304 to the identified object 206, only the pixel data 208 of the identified object 206 is extracted, and the surrounding of the object is not part of the extracted pixel data 208. As such, a method may be provided that facilitates pixel data extraction from an image. This extracted pixel data 208 can then be inserted into the first image 100 to render the desired augmented image 400.

Figure 2D:
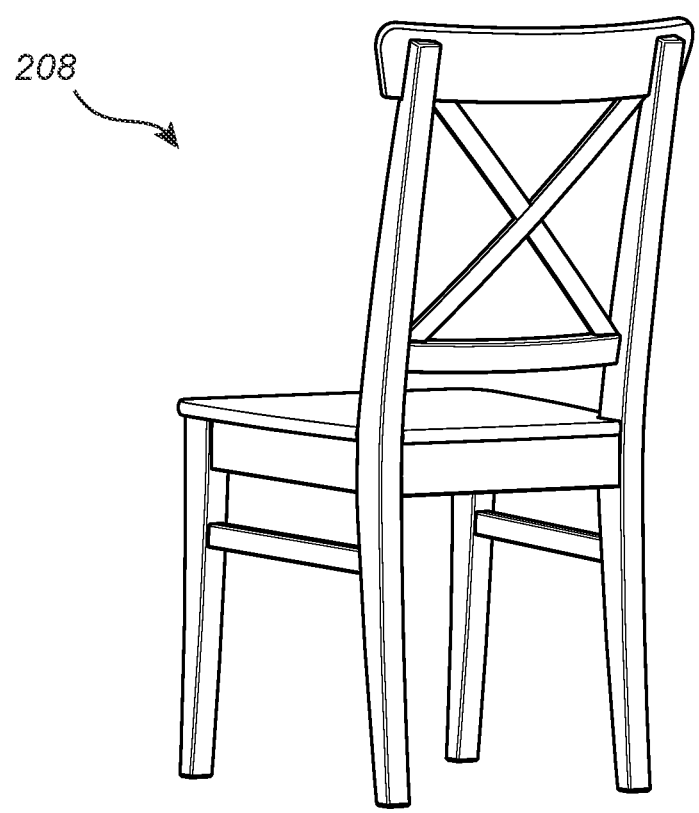
FIG. 2D illustrates extracted pixel data.

The extracted pixel data 208 from the example is shown in FIG. 2D.

Now turning to FIG. 3A-3C it will be discussed how the augmented image 400 is rendered.

Figure 3A:
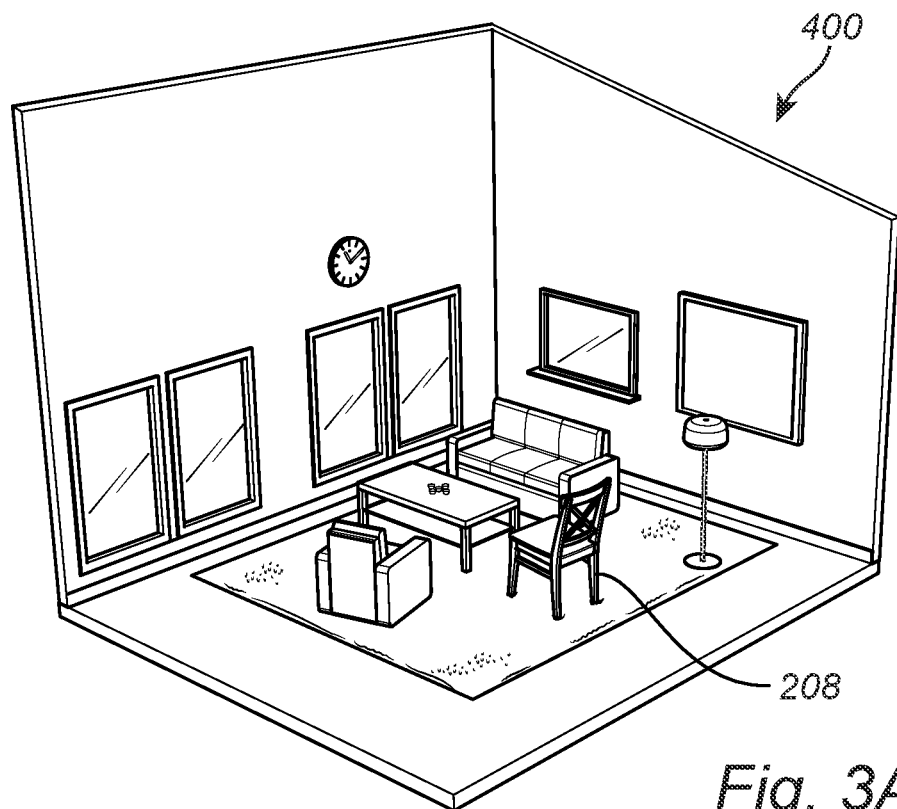
FIG. 3A illustrates an augmented image.

The augmented image 400 is rendered when the extracted pixel data 208 of the second image data 300 is inserted into the first image 100, as is shown in FIG. 3A

The pixel data 208 may in some embodiments be inserted at a position having the object distance and the object angle relative to the first field of view in the first image 100.

Figure 3B:
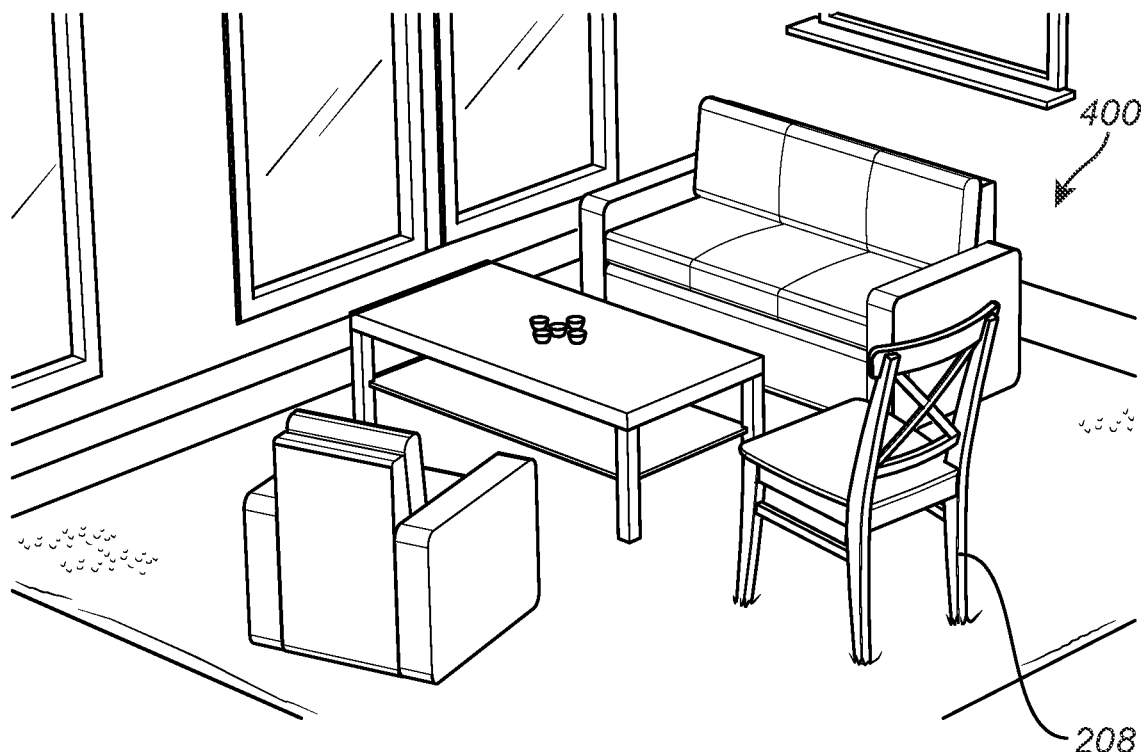
FIG. 3B illustrates a zoomed version of the augmented image from FIG. 3A.
Figure 3C:
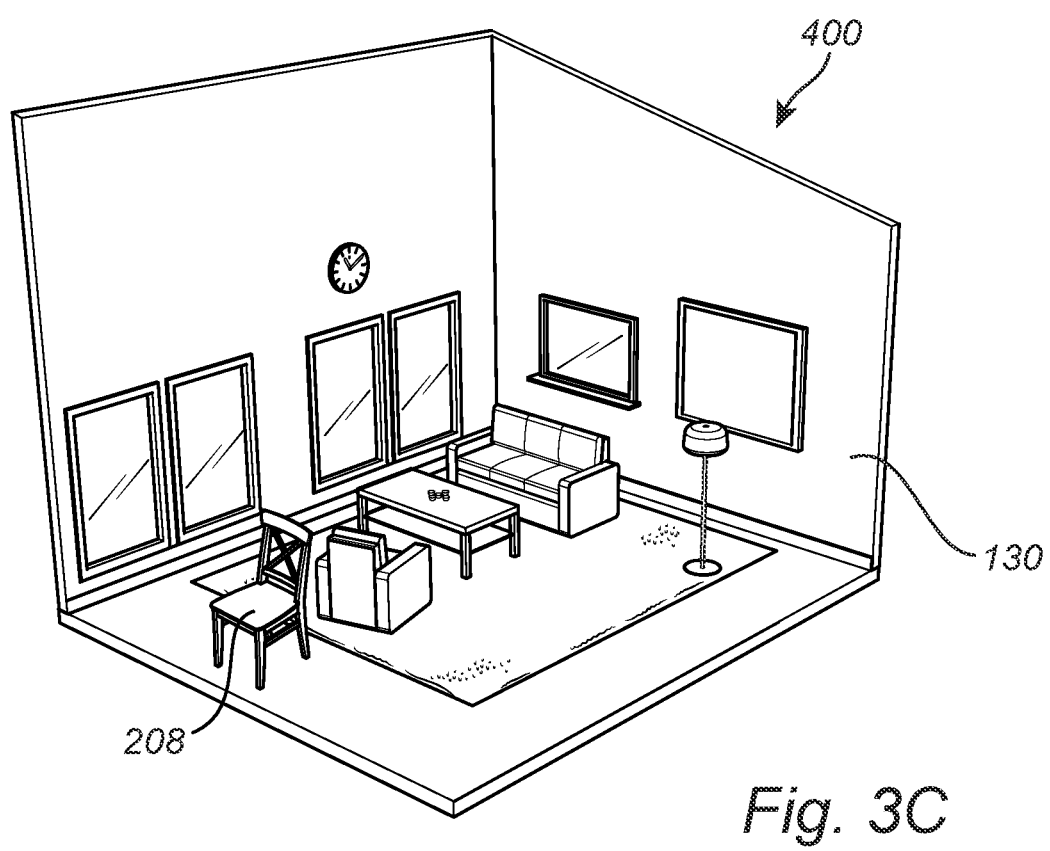
FIG. 3C illustrates another augmented image.

Now turning to FIGS. 3B-3C it is evident that the position of the inserted pixel data in the augmented may be adjusted. This may be achieved by manipulating the first 3D coordinate space of the first image. This may be achieved through zooming in or out the first image 100. The augmented image 400 may be adjusted through translating the first image 100. The position of the inserted pixel data 208 in the augmented image 400 may be adjusted to correspond to the object coordinate in the manipulated 3D coordinate space of the first image 100. In another example, the position of the inserted pixel data 208 may be adjusted by a user manually moving the first image 100 to steer the position of the inserted pixel data 208. Such an action may be performed on a display. Any suitable display may be used.

The augmented image may be displayed on a display screen. The augmented image may be displayed using AR or VR equipment.

The augmented image 400 may be stored in a memory. The first image 100 may be stored in the memory. The second image 300 may be stored in the memory. The extracted pixel data 208 may be stored in the memory.

It may be desirous to perform parts of the method iteratively such as to position the identified object 206 in a desired position in the first image 100. This may be done by first removing the inserted pixel data 208 from the augmented image 400, and thus allow for insertion of different pixel data.

Figure 4A:
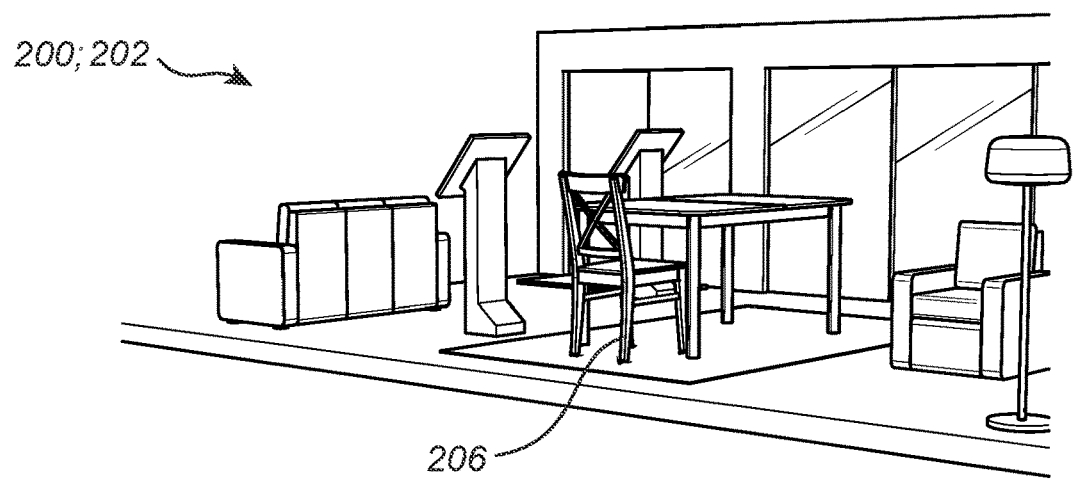
FIG. 4A illustrates a third image of the second scene.

Now turning to FIGS. 4A-4B an example of an embodiment wherein the inserted pixel data 208 is removed will be described. FIG. 4A shows a third image of the second scene. The second scene is here depicted from a different field of view compared to previous figures.

The third image may be captured of the second scene using the image capturing device. Then the previously identified object 206 is re-identified as the identified object 206. The third image 202 may be captured form a different distance to the object or have a different field of view. Accordingly, a third 3D coordinate space for the third image 202 may be calculated. The 3D model 304 is aligned to the identified object 206, and pixel data 208a is extracted from the third image 202 of a contour of the 3D model projection onto the third image 202. The extracted pixel data 208a of the third image 202 is thus not equal to the extracted pixel data 208 from the second image 300. A second object coordinate is determined for the identified object 206 in the third image 202 using the third 3D coordinate space. Then the extracted pixel data 208a of the third image data is inserted into the first image at a position coordinate in the first image corresponding to the second object coordinate, thereby rendering an augmented image 400.

Figure 4B:
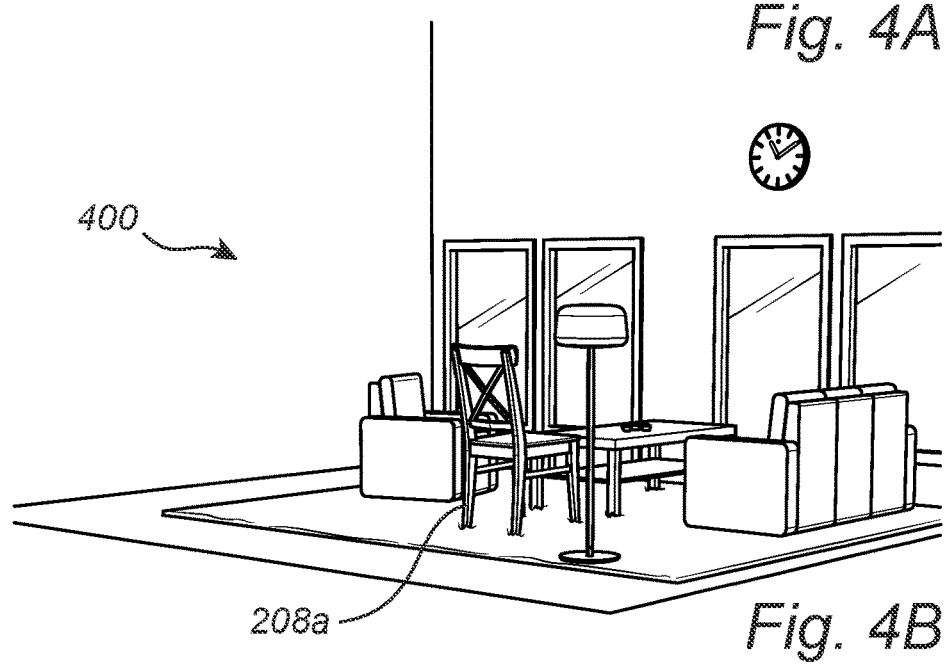
FIG. 4B illustrates the augmented image of FIG. 3D from a different view.

In the disclosed embodiment shown in FIG. 4B the extracted pixel data 208a depicting the chair 206 is inserted into the first image at a position coordinate corresponding to the object coordinate of the identified object in the second image. As such, the realistic view of the inserted object into the first image is retained.

Figure 4C:
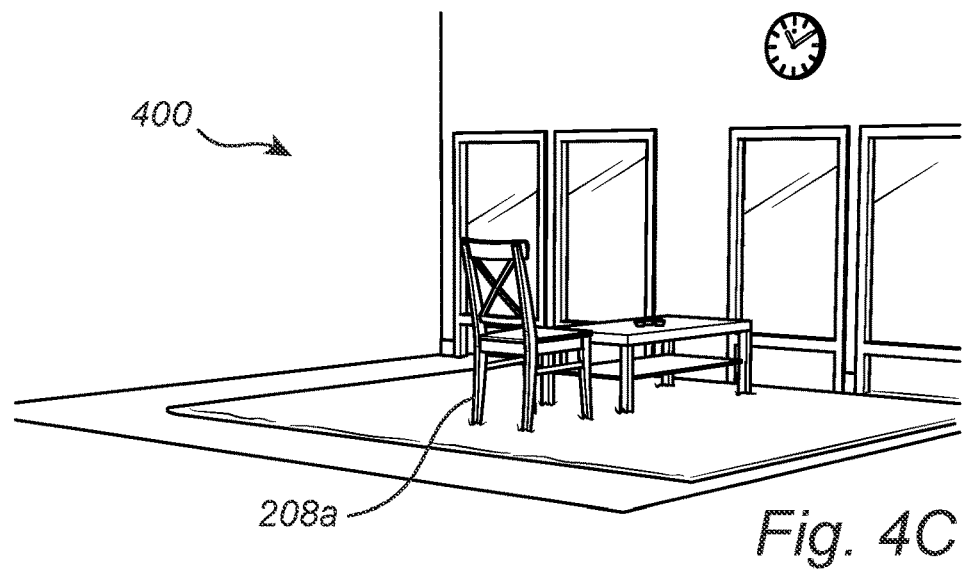
FIG. 4C illustrated a manipulated augmented image of FIG. 4B.

As is evident from FIG. 4C, the augmented image 400 may be manipulated by one or more objects changing positions in the augmented image. In FIG. 4C the sofa, the armchair, and the lamp of the scene has been removed from the scene, thereby creating a plurality of empty spaces. Hence, one or more objects of the first image 100 may be identified and manipulated through removal thereof. The one or more identified objects of the first image may be manipulated through manipulation of the 3D coordinate space first image 100, thereby the identified objects may change position. One or more objects in the first image may be removed or rearranged to create empty spaces.

The one or more objects of the first image may be manipulated through manipulation of the virtual scene depicted in the augmented image. By this, the one or more objects may for example be removed from the augmented image.

Figure 5:
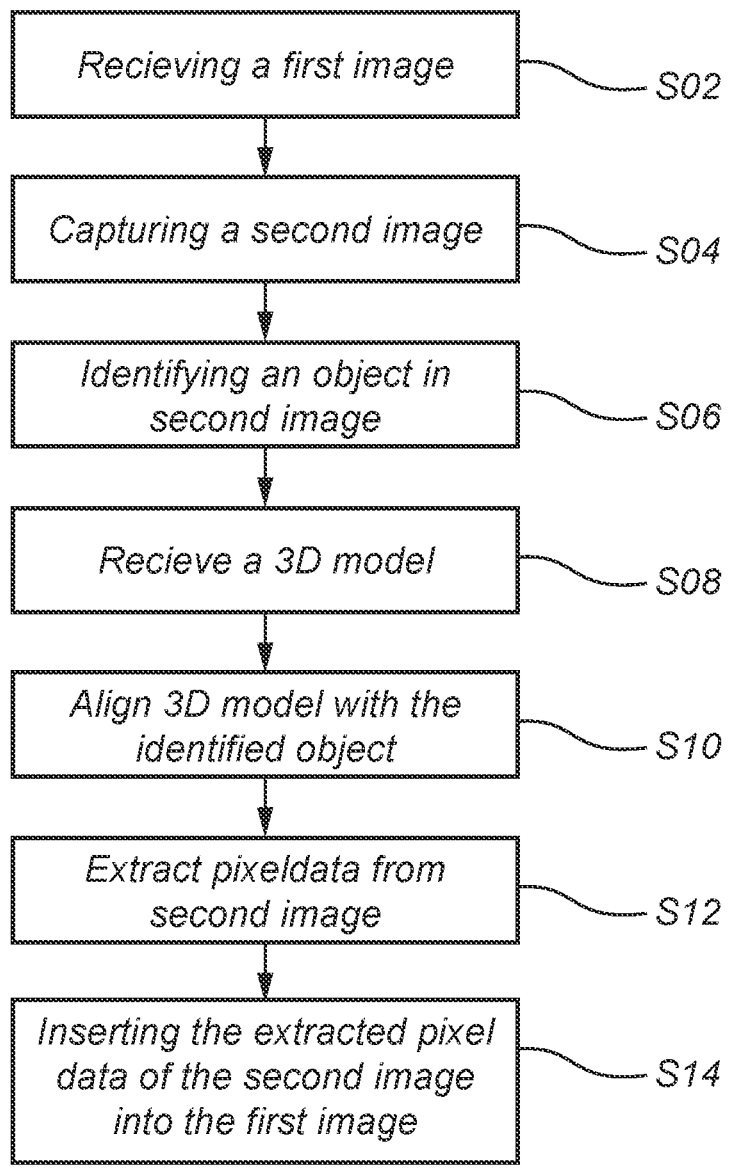
FIG. 5 illustrates a flowchart of a method for rendering an augmented image.

Now turning to FIG. 5 there is disclosed a flowchart of the method for rendering an augmented image 400.

The method comprises receiving S02 a first image depicting a first scene. Using an image capturing device, a second image depicting a second scene is captured S04. In the second image, an object is identified S06 as the identified object. A 3D model is received S08 from a database comprising a plurality of 3D models. The received 3D model is corresponding to the identified object. The 3D model is then aligned S10 with the identified object in the second image. Thereafter pixel data is extracted S12 from the second image using a contour of the 3D model's projection onto the second image. The extracted pixel data of the second image is inserted S14 into the first image, thereby rendering an augmented image.

The person skilled in the art realizes that the present disclosure by no means is limited to the preferred embodiments described above. On the contrary, many modifications and variations are possible within the scope of the appended claims.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The systems and methods disclosed hereinabove may be implemented as software, firmware, hardware or a combination thereof. In a hardware implementation, the division of tasks between functional units referred to in the above description does not necessarily correspond to the division into physical units; to the contrary, one physical component may have multiple functionalities, and one task may be carried out by several physical components in cooperation. Certain components or all components may be implemented as software executed by a digital signal processor or microprocessor, or be implemented as hardware or as an application-specific integrated circuit. Such software may be distributed on computer readable media, which may comprise computer storage media (or non-transitory media) and communication media (or transitory media). As is well known to a person skilled in the art, the term computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information, and which can be accessed by a computer. Further, it is well known to the skilled person that communication media typically embodies computer readable instructions, data structures, program modules or other data in a modulated data signal such as a carrier wave or other transport mechanism and includes any information delivery media.

The invention claimed is:

1. A method of displaying an item in an extended reality scene, the method comprising:
   capturing, using an extended reality device, an image of an object;
   displaying an image of a physical room on a display of the extended reality device; and
   displaying the image of the object on the display of the extended reality device simultaneously with the image of the physical room, wherein the image of the physical room is manipulated to present an augmented image of the object in the physical room;
   wherein the physical room is located remotely from the object and the extended reality device, and the extended reality device is proximate to the object.

2. The method of claim 1 wherein the image of the object has a first scale, the image of the physical room has a second scale, and the first scale is the same as the second scale.

3. The method of claim 1, wherein displaying the object comprises:
   segmenting the object from the image of the object by extracting pixels corresponding to the object from the image of the object.

4. The method of claim 3, wherein:
   displaying the object on the display simultaneously with the image of the physical room comprises inserting the extracted pixels into the image of the physical room thereby rendering an extended reality image.

5. The method of claim 1, further comprising moving the object on the display relative to the image of the physical room.

6. The method of claim 1, further comprising moving the image of the physical room on the display.

7. The method of claim 1, further comprising generating a 3D scene of the physical room.

8. The method of claim 7, wherein generating the 3D scene of the physical room comprises scanning the physical room.

9. The method of claim 8, wherein scanning the physical room comprises capturing an image of the physical room.

10. The method of claim 7, further comprising generating the image of the physical room based at least in part on the 3D scene of the physical room.

11. The method of claim 1, further comprising generating a 3D model of the object.

12. The method of claim 11, wherein generating the 3D model of the object comprises scanning the object.

13. The method of claim 12, wherein scanning the object comprises capturing an image of the object.

14. The method of claim 11, further comprising generating the image of the object based at least in part on the 3D model of the object.

15. The method of claim 14, further comprising retrieving the 3D model of the object from a database.

16. The method of claim 1, further comprising:
   generating a 3D scene of the physical room, the 3D scene of the physical room having a coordinate space; and
   generating a 3D model of the object, the 3D model of the object having a coordinate space;
   wherein displaying the object on the display simultaneously with the image of the physical room comprises displaying the object virtually at a determined location in the coordinate space of the physical room.

17. The method of claim 16, wherein the coordinate space is a 3D coordinate space.

18. The method of claim 1, wherein the extended reality scene is an augmented reality scene or a virtual reality scene.

19. A system for providing an extended reality scene, the system comprising:
   a display;
   a camera device;
   at least one processor;
   at least one memory storing instructions which, when executed by the at least one processor, cause the system to:
   capture an image of an object using the camera device;
   display an image of a physical room on the display; and
   display the image of the object on the display simultaneously with the image of the physical room, wherein the image of the physical room is manipulated to present an augmented image of the object in the physical room;

wherein the physical room is located remotely from the object and the system, and the system is proximate to the object.

20. A non-transitory computer readable storage medium, storing instructions which, when executed by a processor, cause a system for providing an extended reality scene to:

capture an image of an object using a camera device of the system;

display an image of a physical room on a display of the system; and display the image of the object on the display simultaneously with the image of the physical room, wherein the image of the physical room is manipulated to present an augmented image of the object in the physical room;

wherein the physical room is located remotely from the object and the system, and the system is proximate to the object.

* * * * *